United States Patent
Niedecker

(10) Patent No.: US 8,870,634 B2
(45) Date of Patent: Oct. 28, 2014

(54) POLYGONAL SHAPED FILLING TUBE WITH CORRESPONDING CASING BRAKE

(71) Applicant: Poly-clip System GmbH & Co. KG, Hattersheim (DE)

(72) Inventor: Frank Niedecker, Porza (CH)

(73) Assignee: Poly-clip System & GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/184,377

(22) Filed: Feb. 19, 2014

(65) Prior Publication Data

US 2014/0235150 A1     Aug. 21, 2014

(30) Foreign Application Priority Data

Feb. 20, 2013   (EP) .................................... 13156029

(51) Int. Cl.
    *A22C 11/00*    (2006.01)
    *A22C 11/12*    (2006.01)
    *A22C 11/02*    (2006.01)

(52) U.S. Cl.
    CPC ........... *A22C 11/0227* (2013.01); *A22C 11/125* (2013.01)
    USPC .......................................................... 452/37

(58) Field of Classification Search
    CPC .. A22C 11/105; A22C 15/002; A22C 15/001; A22C 11/00; A22C 11/125; A22C 11/008; B65G 2201/0202; B65G 2201/0229; B65G 33/02; B65G 33/32; B65G 33/34; B65G 47/261; B65G 47/61
    USPC ............ 452/21–26, 30–32, 35–37, 46–48, 51
    See application file for complete search history.

(56) References Cited

U.S. PATENT DOCUMENTS

| | | | | |
|---|---|---|---|---|
| 4,430,773 A * | 2/1984 | Becker et al. | ................... | 452/38 |
| 5,087,463 A * | 2/1992 | Raudys et al. | ................ | 426/138 |
| 5,788,563 A * | 8/1998 | Nakamura et al. | .............. | 452/47 |
| 5,918,447 A * | 7/1999 | Hanten et al. | ................... | 53/551 |
| 6,050,888 A * | 4/2000 | Nakamura et al. | .............. | 452/47 |
| 6,645,062 B1 * | 11/2003 | Buckles | .......................... | 452/35 |
| 6,705,063 B1 * | 3/2004 | Topfer et al. | ................... | 53/577 |
| 7,028,451 B2 * | 4/2006 | Braun et al. | ..................... | 53/550 |
| 7,032,875 B2 * | 4/2006 | Sterner et al. | ...................... | 251/5 |
| 7,240,466 B2 * | 7/2007 | Vermee et al. | .................. | 53/417 |
| 7,704,130 B2 * | 4/2010 | Hanten et al. | ................... | 452/32 |
| 7,740,526 B2 * | 6/2010 | Arias Lopez | .................. | 452/32 |
| 7,762,874 B2 * | 7/2010 | Schlieber et al. | ............... | 452/37 |

FOREIGN PATENT DOCUMENTS

EP          1987719 A1    11/2008

* cited by examiner

*Primary Examiner* — Richard Price, Jr.
(74) *Attorney, Agent, or Firm* — Hahn Loeser & Parks LLP

(57) ABSTRACT

The present invention relates to a casing brake and filling tube combination for an apparatus for filling and closing said tubular or bag-shaped packaging casing for applying a frictional force to a tubular or bag-shaped packaging casing being arranged on said filling tube, for limiting the movement of said tubular or bag-shaped packaging casing at least while being filled. The filling tube includes a brake section with which the casing brake assembly comes reversibly into engagement for applying a frictional force to the tubular or bag-shaped packaging casing. The casing brake assembly includes three brake bodies, wherein at least two brake bodies are at least approximately radially reversibly movable towards the brake section of the filling tube between a release position in which the at least two brake bodies are at least partially moved away from the filling tube, and a brake position.

21 Claims, 5 Drawing Sheets

POLYGONAL SHAPED FILLING TUBE WITH CORRESPONDING CASING BRAKE

This application claims priority to, and the benefit of, European Patent Application No. 13 156 029.4-1655 filed Feb. 20, 2013 with the European Patent Office, which is hereby incorporated by reference.

BACKGROUND OF THE INVENTION

The present invention relates to a casing brake and filling tube combination for an apparatus for filling and closing said tubular or bag-shaped packaging casing, like a clipping machine according to independent claim 1.

In practice, it is known that, for example in the production of sausage-shaped products, like sausages, filling material is fed by a filling machine through a filling tube of a clipping machine into a tubular or bag-shaped packaging casing which is temporarily stored on the filling tube and which is closed at its front end, i.e. the end pointing in the feeding direction of the filling material by a closure means, like a closure clip, or by fusing this end, respectively. The tubular packaging casing is pulled-off from the filling tube while being filled by the feeding pressure. At least during the filling process, a casing brake applies a frictional force to the tubular packaging casing while being pulled-off from the filling tube, in order to control the pull-off speed and to ensure an at least approximately constant filling degree. After a predetermined volume of filling material has been filled into said tubular packaging casing, a displacer arrangement with a first and a second displacer unit which can each be formed by a pair of reversibly moveable displacement elements, a plait-like portion of the tubular packaging casing is formed. The clipping machine then places and closes at least one closure clip at the plait-like portion forming the rear end of the sausage or bag-shaped product, i.e. the end pointing opposite to the feeding direction by respective closing tools which are reversibly movable towards the plait-like portion.

A known casing brake assembly which is used for the purpose described above, is disclosed in EP patent application 1 987 719. This casing brake assembly includes two brake rings. A first brake ring is firmly mounted on the filling tube and has a brake surface arranged at its outer circumference. A second brake ring coaxially surrounds the first brake ring being arranged on the filling tube. The outer or second brake ring has a circular lip acting on the inner or first brake ring for applying a frictional force on the tubular packaging casing material guided between the two brake rings. For adjusting the brake force, the outer brake ring is shifted parallel to the filling tube axis relative to the inner brake ring. For removing at least the outer brake ring from the filling tube, e.g. in order to refill tubular packaging casing material to the filling tube, the outer brake ring has to be moved in the filling direction and has to be removed from the filling tube.

In a clipping machine comprising these known assemblies, additional space has to be provided in the region of the outflow end of the filling tube for removing the casing brake assembly or parts therefrom, respectively. In order to provide the required space, the filling tube and/or the clipping machine which is positioned downstream the filling tube, has to be arranged such that it can be reversibly moved in the filling direction, which requires an additional effort in their construction and additional space at the installation site.

Thus, it is an object of the present invention to provide a casing brake and filling tube combination which overcomes the above mentioned drawbacks and which allows a simplified and compact construction of a clipping machine.

SUMMARY OF THE INVENTION

The above object is solved by the features of independent claim 1. Advantageous configurations of the clipping machine are described in claims 2 to 3.

According to the present invention, there is provided a casing brake and filling tube combination for an apparatus for filling and closing said tubular or bag-shaped packaging casing, like a clipping machine, the casing brake and filling tube combination is provided for applying a frictional force to a tubular or bag-shaped packaging casing being arranged in particular temporarily arranged on said filling tube, and for limiting the movement of said tubular or bag-shaped packaging casing at least while being filled. The casing brake and filling tube combination comprises a casing brake assembly and a filling tube. The filling tube includes a brake section with which the casing brake assembly comes reversibly into engagement for applying a frictional force to the tubular or bag-shaped packaging casing. The casing brake assembly according to the present invention includes three brake bodies, wherein at least two brake bodies are at least approximately linearly and radially reversibly movable towards the brake section of the filling tube between a release position in which the at least two brake bodies are at least partially moved away from the filling tube, and a brake position, in the brake position, the three brake bodies at least approximately completely surround the brake section of the filling tube. In the inventive casing brake and filling tube combination, the filling tube has an at least approximately polygonal cross-section, and the three brake bodies each enclose a corresponding polygonal shaped clearance facing to the filling tube and matching with the polygonal cross-section of the brake section of the filling tube when in the brake position.

This inventive combination allows the brake bodies to be removed from the brake section of the filling tube in a direction vertical to the longitudinal axis of the filling tube, without being shifted parallel to the longitudinal axis of the filling tube. Thereby, no additional space is required in the region of the outflow end of the filling tube for removing the casing brake assembly or parts of it from the filling tube, respectively. Moreover, it is not necessary to exchange the casing brake assembly with its three brake bodies when the size of the filling tube, i.e. the diameter of the filling tube having a polygonal cross-section has to be changed due to, for example, requirements of the protection process. Moreover, the radial movement, in particular the linear and radial movement allows simple construction for carrying out the movement of the brake bodies from their released positions to the brake positions and a simple design of the respective drive device. Moreover, by using a filling tube having a polygonal cross-section which co-acts with corresponding polygonal shaped brake sections of the brake bodies, in the brake position, the brake sections are in a linear contact with the plane surface sections of the polygonal shaped filling tube. Thereby, a save sealing and braking function is enabled.

In a preferred embodiment of the inventive casing brake and filling tube combination, the third brake body is mounted in the brake position, preferably fixedly mounted in the brake position. That means, the third brake body may be mounted in a fixed position relative to the filling tube, i.e. in the brake position. The third brake body mounted in the brake position provides an abutment for the filling tube when pivoted into the filling position.

Alternatively, the third brake body is not exclusively fixed in the brake position, but may also be moved reversibly, radially and linearly towards the filling tube. In this case, the position of the third brake body may be adapted relative to the central axis of the filling tube in the filling position by radially and linearly shifting the third brake body, and the length of the moving path, in particular, the end position in vicinity to the filling tube or the brake position, of the two linearly and radially reversibly movable brake bodies may be adapted to the diameter of the filling tube. Naturally, also the third brake body may be radially shifted away from the filling tube together with the first and second brake bodies.

The cross-section of the filling tube may have any suitable polygonal shape, like a triangle, a tetragon or a hexagon etc. In the case that the brake section of the filling tube has a triangular cross-section, three brake bodies are provided having a V-shaped cutout or clearance, respectively. The V-shaped clearance of each brake body allows that the corner portion of the V-shaped clearance as well as both linear sections or legs extending from that corner portion of the V-shaped clearance can come into a tight contact with the respective corner portion of the polygonal shaped filling tube as well as the linear sections on both sides of that corner portion. Thus, a good sealing can be provided. In this case, each surface of the polygonal shaped filling tube is in contact with the brake surfaces of the three brake bodies for enabling a save sealing and braking function.

The brake section of the filling tube can have a triangular cross-section wherein three brake bodies are provided each of which encloses a V-shaped clearance or cutout, respectively.

The brake section of the filling tube may also have a hexagonal cross-section, and the at least two brake bodies have a corresponding square-shaped cutout or clearance, respectively.

It has to be understood, that the angle of the V-shaped or square-shaped cutout or clearance, respectively, corresponds to the angle of the respective corner of the polygonal shape cross-section of the filling tube. Moreover, it has also to be understood that regular polygons are preferred for the shape of the cross-section of the filling tube, in order to allow the use of identical brake bodies.

In a preferred embodiment of the present invention, the polygonal cross-section of the filling tube comprises rounded edges or corners of a predefined radius, and the edges or corners of the cutouts of the brake bodies have corresponding radii, in order to ensure a secure sealing and braking function also in the region of the edges or corners of the filling tube.

In a further advantageous embodiment of the present invention, the three brake bodies comprise braking and sealing elements facing towards the filling tube and forming brake surfaces which come in contact with the packaging casing material for the breaking and sealing function. Said braking and sealing elements thereby engage the packaging casing material for applying a predefined braking force to the casing material and for providing a sealing to avoid an unintentional backflow of filling material into the packaging casing material stored on the filling tube.

In order to prevent the packaging casing material from being damaged by the braking and sealing elements, said braking and sealing elements consist of a suitable material and/or may have a suitable form. In a preferred embodiment, the braking and sealing elements may be formed by resilient brake lips. Alternatively, the braking and sealing elements may be formed by string-shaped resilient elements.

In a further preferred embodiment, the braking and sealing elements are of an at least partially approximately tubular inflatable construction. By a controlled inflating or deflating said inflatable braking and sealing elements, a predefined brake force may be adjusted.

According to the present invention, at least one drive is provided for a in particular linearly driving the three brake bodies radially towards the brake section of the filling tube, for enabling refilling packaging casing material to the filling tube and to engage the packaging casing material while being pulled-off from the filling tube during the filling process. Additionally, also an adjustment of the braking force may be realized by said drive.

In an alternative embodiment, separate drives are provided for each of the three brake bodies. In this case, the activation of the separate drives has to be adjusted to each other, e.g. for applying identical brake forces to the casing material.

In order to adjust a predefined brake force and to control the movement of the brake bodies between the release position and the brake position, a control unit is provided for controlling the drives of the at least two bodies elements.

In principal, the brake bodies can enclose the filling tube such that the ends of the breaking and sealing elements viewed in the circumferential direction of the filling tube abut to each other. In such a case at least the two linearly and radially movable brake bodies are moveable at least approximately in the same plane extending vertically to the center axis of the filling tube. However, it is also possible that the brakes bodies, and in particular the braking and sealing elements, overlap partially each other viewed in the circumferential direction of the filling tube. This solution increases the sealing and breaking function of the braking assembly. If three brake bodies are provided, the ends of the brake bodies facing in the circumferential direction of the filling tube can overlap in a laminar manner, i.e. that the end of one brake body facing in one of the circumferential directions of the filling tube overlapped the end of the following brake body facing in the circumferential direction opposite to the circumferential direction of the end of the previous brake body etc.

Moreover, a casing brake and filling tube combination according to the present invention is provided, for use in an apparatus for filling and closing said tubular or bag-shaped packaging casing, like a clipping machine. Said casing brake and filling tube combination, as an upgrade part, may replace known casing brakes and filling tubes in existing clipping machines.

Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

DETAILED DESCRIPTION OF THE INVENTION

Figure 1:
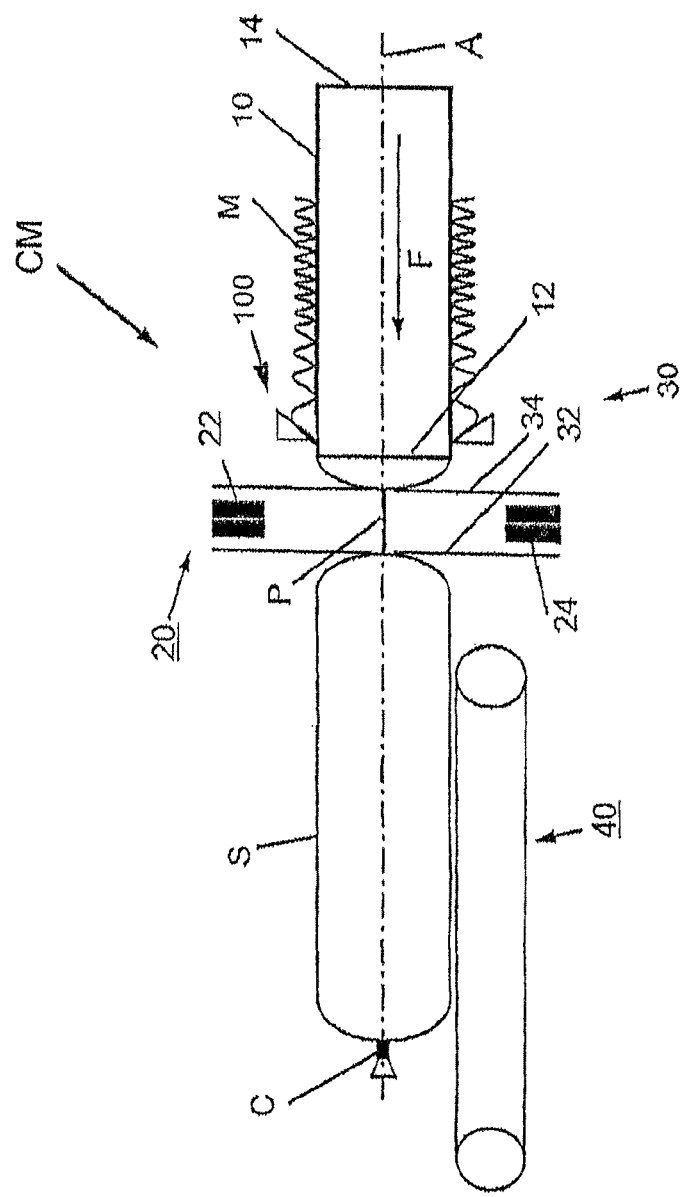
FIG. 1: is a schematic view to a clipping machine including a casing brake and filling tube combination according to the present invention.

A clipping machine CM for producing sausage-shaped products S shown in FIG. 1, comprises as main components a casing brake and filling tube combination according to the present invention, including a filling tube 10 having a longitudinally extending central axis A. Filling tube 10 is made of a suitable material, like stainless steel, wherein a tubular packaging casing material M made of a thin sheet material is stored on the filling tube 10. From the tubular packaging casing material M, a single packaging casing is derived during the process of manufacturing the sausage-shaped products S. Clipping machine CM further comprises a clipping device 20, and gathering means 30 for gathering the filled tubular packaging casing M and for forming a plait-like portion thereto which are all arranged downstream filling tube 10. Clipping device 20 is provided for closing the filled tubular packaging casing M by applying closure means, like closure clips C, to said plait-like portion P.

As it can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F into tabular packaging casing M closed on its front end facing in the filling direction F by a closure clip C.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tools 22, 24 includes a punch and a die. Gathering means 30 includes a first displacer unit 32 and a second displacer unit 34, wherein first displacer unit 32 is positioned downstream second displacer unit 34. First and a second pair of clipping tools 22, 24 of clipping device 20 are positioned between first and second displacer units 32, 34.

Furthermore, for discharging sausage-shaped product S just produced from clipping machine CM, downstream clipping device 20, a transportation device like a belt conveyor 40 is arranged, comprising a conveyor belt and guide rollers. Transportation direction T of belt conveyor 40 coincides with feeding direction F. The height of the upper conveyor belt section of belt conveyor 40 is aligned to the lower side of the sausage shaped product S to be produced and discharged from clipping machine CM.

Clipping machine CM further comprises a casing brake assembly 100, which is arranged on filling tube 10 in the vicinity of left end 12 of the filling tube 10 in order to control the movement of tubular packaging casing M when pulled-off from filling tube 10 by the filling pressure. Casing brake assembly 100 together with filling tube 10 forms the inventive casing brake and filling tube combination. In FIG. 1, only the braking and sealing elements of casing brake assembly 100 are shown. The casing brake assembly 100 according to the present invention will be described in greater detail in conjunction with FIGS. 2 to 8.

Figure 2:
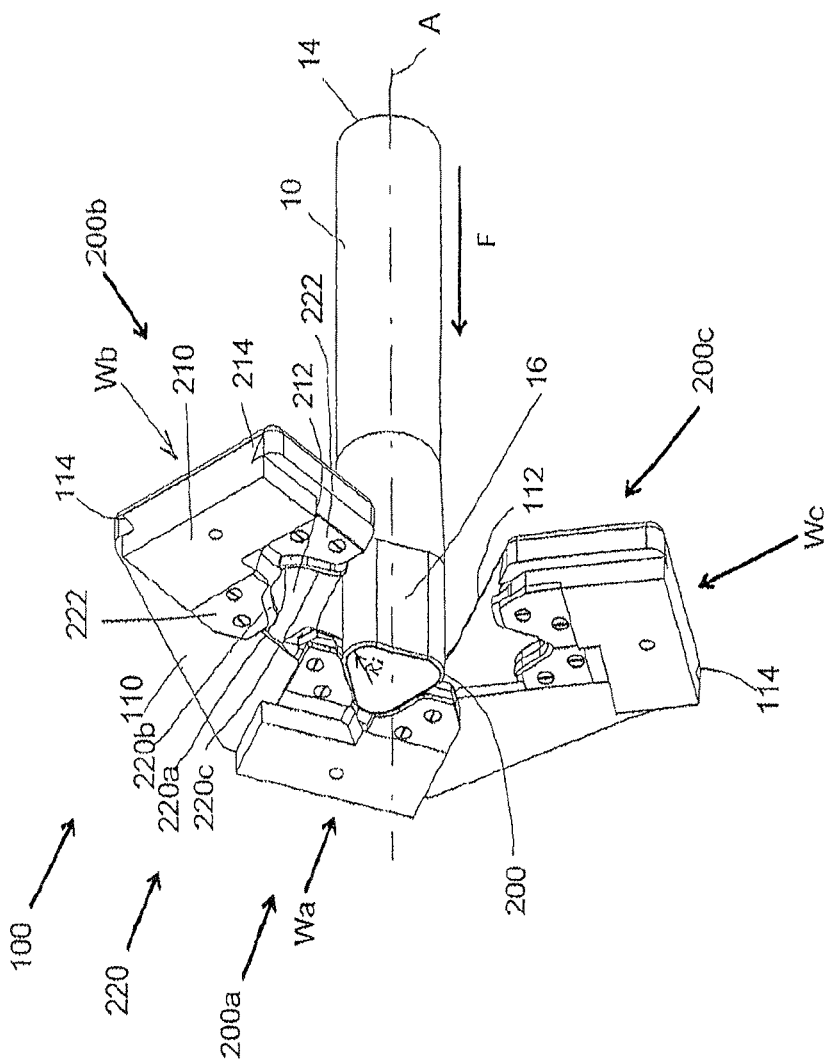
FIG. 2: is a schematic and perspective view to an embodiment of a casing brake and filling tube combination according to the present invention with the casing brake assembly in the release position.

FIG. 2 is a schematic view to an embodiment of an inventive casing brake and filling tube combination according to the present invention with casing brake assembly 100 in the release position.

As it can be seen in FIG. 2, filling tube 10 has a brake section 16 extending from left end 12 of filling tube 10 towards right end 14. In FIG. 2, filling tube 10 is in the filling position in which filling material may be fed into tubular packaging casing M (not shown in FIG. 2) stored on filling tube 10. Brake section 16 has a polygonal, in particular triangular cross-section and is surrounded by casing brake assembly 100 which engages brake section 16 in order to apply a frictional force to tubular packaging casing M when pulled-off from filling tube 10 during the filling process and to provide a sealing function against a backflow of the filling material during the filling process. The edges or corners of the triangular cross-section of brake section 16 are rounded and have identical radii Ri. Casing brake assembly 100 is arranged at least approximately coaxially to central axis A of filling tube 10. It has to be noted that the filling tube 10 can have a cylindrical cross-section after the brake section 16 viewed to right end 14 of it, as it can be seen in FIG. 2. The ratio of the length of the brake section 16 to the length of the other section of filling tube 10 can be such that both sections have the same length, preferably that the length of the broke section 16 is shorter than the length of the other section, and more preferably that the length of the brake section 16 is less than one third of the length of the other section of filling tube 10. However, filling tube 10 can also have a polygonal, in particular triangular cross-section over its whole length.

Casing brake assembly 100 comprises a frame element 110 which carries three brake bodies 200a, 200b, 200c which are of identical construction or shape, respectively. Frame element 110 extends in a plane at least approximately vertically to central axis A of filling tube 10 and includes an approximately C-shaped cut-out or clearance 112 through which filling tube 10 extends with brake section 16. On the side surface of frame element 110, which faces in the feeding direction F, pairs of linear guide dovetailed guide grooves 114 are arranged which extend radially to the center of C-shaped cutout or clearance 112, which coincides with central axis A of filling tube 10 when in the filling position. The pairs of guide grooves 114 are aligned in regular angles around filling tube 10. In the embodiment of FIG. 2, three guide grooves 114 are shown, accordingly, the angle between following pairs of guide grooves 114 is 120°.

Each brake body 200a, 200b, 200c comprises an approximately planar base portion 210 with an approximately V-shaped cutout or clearance 212 directed in a working direction Wa, Wb, Wc, towards filling tube 10 when in the filling position. On the side surface of base portion 210 which faces towards frame element 110, a dovetailed tongue 214 is provided matching with the pairs of dovetailed grooves 114 of frame element 110, forming a common guidance in which brake bodies 200a, 200b, 200c are linearly and radially reversibly movable each in working direction Wa, Wb, Wc.

V-shaped cutout or clearance 212 has linear side portions which form the "V", arranged in an angle which matches the angle of the triangular cross-section of brake portion 16 of filing tube 10. The tip end of V-shaped cutout or clearance 212 is rounded and has a radius which matches the radius of the edges or corners of triangular cross-section of brake portion 16.

In each V-shaped cutout or clearance 212 of brake bodies 200a, 200b, 200c, a braking and sealing element 220 is arranged, which faces in working direction Wa, Wb, Wc, towards filling tube 10 when in the filling position. Braking and sealing element 220 is made of a suitable material, like a resilient plastic or rubber, which allows applying a sufficient brake force to tubular packaging casing M when being pulled-off from filling tube 10 during the filling process without damaging casing material M. According to the embodiment of FIG. 2, braking and sealing element 220 has an approximately flat, lip-shaped body and is attached to base portion 210 by suitable mounting means like mounting plates 222. Mounting plates 222 thereby allow an easy exchange of braking and sealing element 220 installed on casing brake assembly 100 by other braking and sealing element 220, e.g. of other size or other construction. Such an alternative embodiment of braking and sealing element 220 may comprise a string shaped element, which in a further alternative construction, may comprise an inflatable tubular string-shaped portion.

Braking and sealing element 220 comprises a central portion 220a which is formed by the rounded middle portion, and two approximately linear portions 220b, 220c extending from the middle portion along V-shaped cutout or clearance 212 of base portion 210 of brake body 200.

Braking and sealing element 220 extends approximately in the plane of frame element 110 and vertically to central axis A of filling tube 10 when in the filling position. Central portions 220a of braking and sealing elements 220 of brake bodies 200a, 200b, 200c, are arranged in a common plane. Linear portions 220b, are aligned with an offset to central portion 220a in filling direction F, whereas linear portions 220c are aligned to central portions 220a with the same offset, but in the counter direction to filling direction F. The offset amounts to half of the width of sealing element 220 in the feeding direction F.

As it further can be seen in FIG. 2, brake bodies 200 are held and guided in casing brake assembly 100 by guidances formed by dovetailed grooves 114 and tongues 214. Accordingly, also brake bodies 200a, 200b, 200c are arranged in regular intervals around filling tube 10.

Brake bodies 200a, 200b, 200c are linearly reversible movable in working direction Wa, Wb, Wc, along guidances 114, 214 by respective drives which are not shown in the Figures. It has to be understood that any suitable drive may be used, like electric drive motors or hydraulic or pneumatic piston/cylinder drives. Furthermore, each brake body 200a, 200b, 200c may comprise a separate drive, or a common drive may be provided for commonly driving brake bodies 200a, 200b, 200c.

Figure 3:
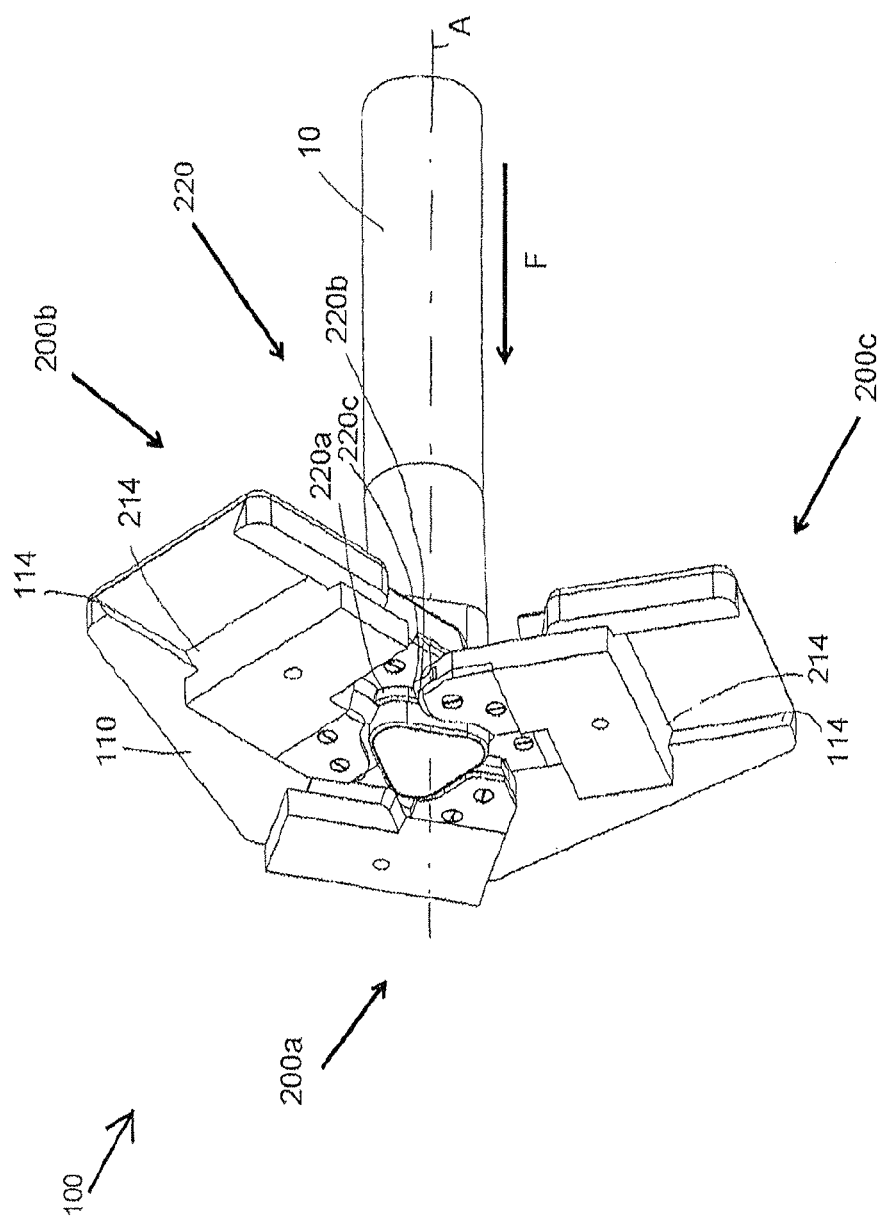
FIG. 3: is a schematic and perspective view to the casing brake and filling tube combination according to FIG. 2 with the casing brake assembly in the brake position.

FIG. 3 is a schematic and perspective view to the casing brake and filling tube combination according to FIG. 2 with the casing brake assembly 100 in the brake position.

In the brake position, brake bodies 200a, 200b, 200c are moved along guidances 114, 214 in working direction Wa, Wb, Wc, for engaging brake section 16 of filling tube 10. Thereby braking and sealing elements 220 come in contact with tubular packaging casing M (not shown) provided on filling tube 10, and apply a frictional force to tubular packaging casing M.

Braking and sealing elements 220, when in the brake position, form a closed ring of a triangular shape, surrounding brake section 16 of filling tube 10. As it can be seen in FIG. 3, central portions 220a of braking and sealing elements 220 are arranged in a common plane vertically to central axis A of filling tube 10, whereas linear portions 220b, 220c of braking and sealing elements 220 are arranged in parallel planes downstream and upstream central portions 220a and with an offset thereto. In the brake position the free ends of linear portions 220b, 220c are arranged subsequently in filling direction F and are in contact with each other such that they overlap the following braking and sealing element 220, in order to realize the closed ring without any gaps.

Figure 4:
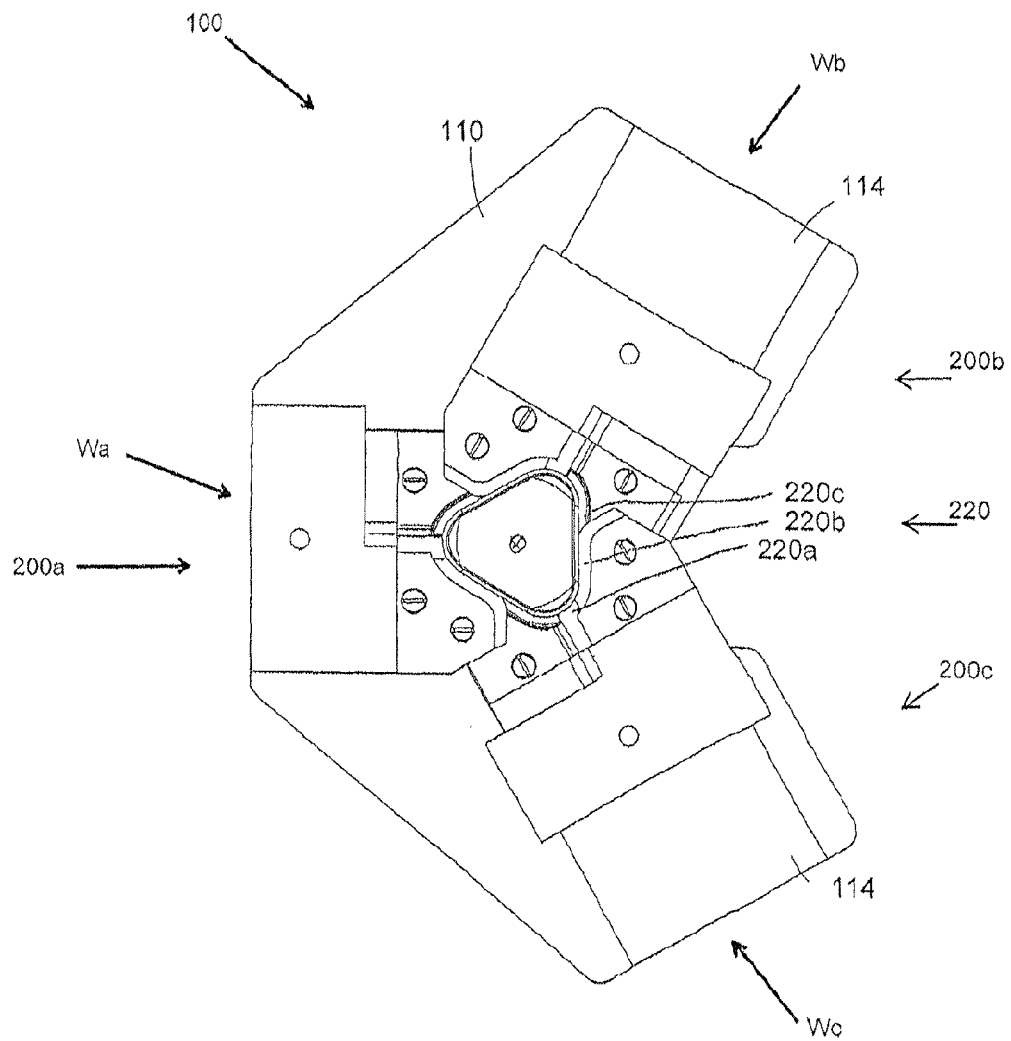
FIG. 4: is a schematic view to the casing brake and filling tube combination according to FIG. 3, seen in a direction contrary to the filling direction.

FIG. 4 is a schematic and perspective view to the casing brake and filling tube combination in the brake position according to FIG. 3, seen in a direction contrary to filling direction F.

When in the brake position, braking and sealing elements 220 of brake bodies 200a, 200b, 200c of casing brake assembly 100, form a closed ring, whereby the free ends of linear portions 220b, 220c cover or overlap each other for forming a closed ring, as it can be seen in FIG. 4.

Frame element 110 comprises three pairs dovetailed grooves 114, in each of which one of brake bodies 200a, 200b, 200c is linearly as well as radially and reversibly movable guided in working direction Wa, Wb, Wc. As it further can be seen in FIG. 4, the pair of dovetailed grooves 114 in which brake bodies 200b, 200c are guided, have a length which exceeds the length of brake bodies 200b, 200c in working direction Wb, Wc, whereas the length of the pair of dovetailed groove 114 in which brake body 200a is guided, is at least approximately equal to the length of brake body 200a seen in working direction Wa.

Figure 5:
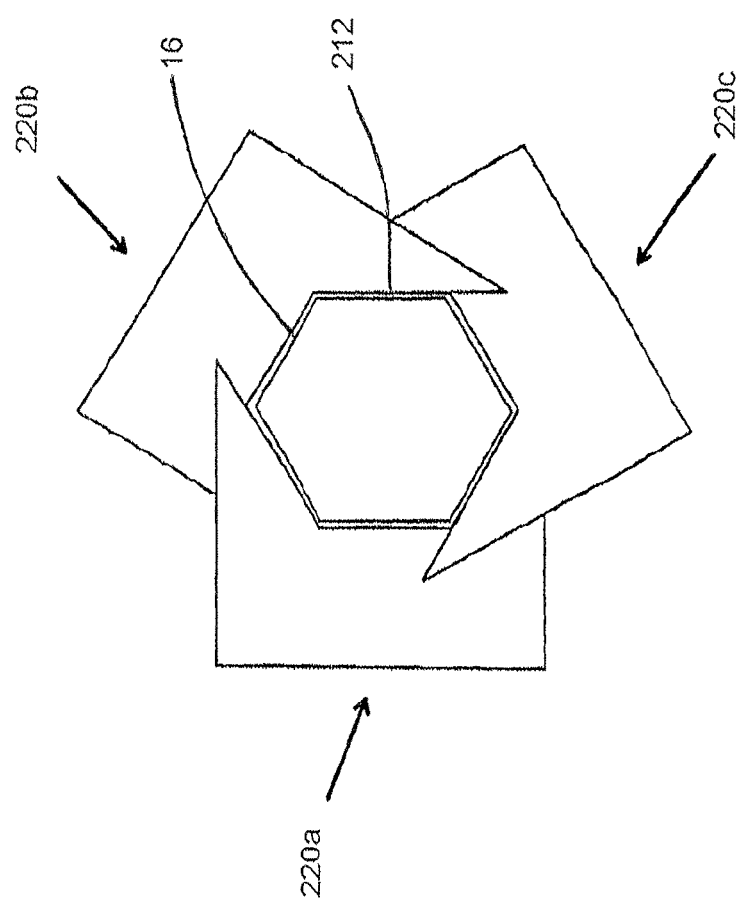
FIG. 5: is a schematic drawing of a further embodiment of a casing brake and filling tube combination according to the present invention.

FIG. 5 is a schematic drawing of a further embodiment of a casing brake and filling tube combination according to the present invention.

In the embodiment of a casing brake and filing tube combination, the filling tube has a brake section 16 which has a regular hexagonal cross-section. Accordingly, each of the three brake bodies 200 has a trapezoidal cutout 212 which matches the hexagonal cross-section of brake section 16 of the filling tube.

Naturally, even if not shown in detail, also in cutouts 212 of the casing brake and filling tube assembly of FIG. 5, braking and sealing elements, similar to those described in conjunction with FIGS. 2 to 4, are arranged, matching the shape of trapezoid cutouts 212, and, in the brake position, the free ends of said braking and sealing elements overlap with each other in order to form a closed ring of a hexagonal shape, to ensure a save sealing and braking function.

In the production of sausage-shaped products S by means of the casing brake and filling tube assembly according to the present invention, filling material is fed in the filling direction F by a filling machine through filling tube 10 into tubular casing material M stored on filling tube 10. At least during the filling process, casing brake assembly 100 engages brake section 16 of filling tube 10 for applying a frictional force to tubular casing material M, and for sealing the interior side of tubular packaging casing M against filling tube 10 for preventing unintentional back flow of filing material therethrough.

At the beginning of the filling process, tubular packaging casing M has to be stored on filling tube 10. Filling tube 10 has to be moved out of the filling position, which is shown in FIGS. 2 to 4. Filling tube 10 may be pivoted about a hinge arranged in the region of right end 12 of filling tube 10, and by means of which filling tube 10 may be coupled to a filling machine, or may be linearly move or rotated out of the filling position in known manner. For the following description of the function of the inventive casing brake and filling tube assembly, it is supposed that filling tube 10 may reversibly be pivoted out of the filling position about a hinge arranged at the right end 12 of filling tube 10, and in a horizontal plane.

For pivoting filling tube 10 out of the filling position, brake bodies 200a, 200b, 200c are in the release position, as shown in FIG. 2, with brake bodies 200b, 200c moved contrary to working directions Wb, Wc, and with a maximum distance to the brake position. Since brake body 200a which is arranged on the rear side of casing brake assembly 100, even when in the brake position, does not constrain filling tube 10 when pivoted out of the filling position, brake body 200a remain in the brake position and does not need to be moved. In the release position, filling tube 10 is pivoted out of the filling position, and tubular packaging casing M closed at its front end by a closure clip C, is stored on filling tube 10. Thereafter, filling tube 10 is pivoted back into the filling position. Brake section 16 of filling tube 10 thereby abuts braking and sealing element 220 of brake body 200a. It has to be noted that brake body 200a may positioned such that it may act as an abutment identifying the filling position of filling tube 10.

After filling tube 10 has been pivoted into the filling position, brake bodies 200b, 200c are moved in working direction Wb, Wc until braking and sealing elements 220 engage tubular packaging casing M on brake section 16. In order to apply a predefined brake force to tubular packaging casing M, brake bodies 200a, 200b, 200c may be brought into a predefined position relative to filling tube 10. Alternatively, sensors may be provided for determining the brake force, e.g. by sensing the pressure applied to brake section 16 by brake bodies 200a, 200b, 200c, or the pressure inside braking and sealing elements 220 when comprising inflatable tubular portions.

The movement of brake bodies 200a, 200b, 200c is controlled by a control unit to which said drives are coupled. Said control unit may adjust the correct position of brake bodies 200a, 200b, 200c by acting on the one or more drives of the brake bodies 200a, 200b, 200c, in order to adjust a predefined brake force.

In an alternative embodiment, filling tube 10 may comprise an abutment for identifying the filling position, independently from the position of brake body 200a. In this case, in the release position, also brake body 200a may be shifted away from filing tube 10.

Brake bodies 200a, 200b, 200c may be provided with separate drives which are coupled to and separately controlled by the control unit. It is also possible to provide a single drive which is coupled to brake bodies 200a, 200b, 200c by respective coupling means, like a suitable mechanic, for commonly drive brake bodies 200a, 200b, 200c.

The control unit may also be used for controlling the clipping machine, e.g. for preventing a filling process when the brake bodies are in the release position, for stopping the clipping machine when detecting incorrect brake force values, and for a correction of the position of the brake bodies for readjusting a predefined brake force.

In conjunction with the embodiment of a casing brake and filling tube combination according to FIG. 5, it has to be noted that it may also possible to provide only two brake bodies 200. In case of a filling tube having a braking section of a hexagonal cross-section, also two brake bodies having trapezoidal cutouts, when in the brake position, may form a closed ring completely surrounding the braking section of the filling tube.

Naturally, the braking section of the filling tube may have any other polygonal-shaped cross-section, like a rectangular cross-section. It is essential that the brake bodies have cutouts matching the shape of the braking section of the filling tube, and that they form a closed ring without any gab between the ring sections, when in the brake position.

From the embodiments of the inventive casing brake and filling tube combination according to FIGS. 2 to 5, it becomes clear that the filling tubes may be vary in size, and that an adaption of the casing brake to the size of the filling tube may be executed by adjusting the brake position of the brake bodies along their moving paths in the working direction. This adjustment may be done manually by selecting a brake position of the brake bodies corresponding to a filling tube of the respective size. Alternatively, this adjustment may be done automatically, by using the sensors for determining the brake force, which may also detect an abutment of the brake bodies on the brake section of the filling tube. Naturally, separate abutment or position sensors may be provided. When using filling tubes of different size together with the same casing brake assembly, it is necessary that the radii of the rounded edges of the braking sections of the filling tubes are identical and coincide with the radii of the central portions of the braking and sealing elements, to ensure a correct sealing function.

The casing brake and filling tube combination according to the present invention may be provided as an upgrade part for existing clipping machines. That means, the casing brake assembly and the filling tube in an existing clipping machine may be exchanged, and the casing brake assembly, in particular the one or more drives of the casing brake assembly have to be coupled to the control unit of the clipping machine.

Alternatively, the casing brake and filling tube assembly according to the present invention may also be provided as including a shortened filling tube or as including just a braking section which may be mounted to the free end of an existing filling tube. Thereby a complete exchange of the prior filling tube and its mounting and pivoting means is not necessary.

The invention claimed is:

1. A casing brake and filling tube combination for an apparatus for filling and closing said tubular or bag-shaped packaging casing, like a clipping machine, wherein the casing brake and filling tube combination is provided for applying a frictional force to a tubular or bag-shaped packaging casing being arranged on said filling tube, and for limiting the movement of said tubular or bag-shaped packaging casing at least while being filled, and wherein the casing brake and filling tube combination comprises a filling tube and a casing brake assembly,
   wherein the filling tube includes a brake section with which the casing brake assembly comes reversibly into engagement for applying a frictional force to the tubular or bag-shaped packaging casing,
   wherein the casing brake assembly includes three brake bodies, wherein at least two brake bodies are at least approximately radially reversibly movable towards the brake section of the filling tube between a release position in which the at least two brake bodies are at least partially moved away from the filling tube, and a brake position, in the brake position, the three brake bodies at least approximately completely surround the brake section of the filling tube, and
   wherein the filling tube has an at least approximately polygonal cross-section, and the three brake bodies each enclose a corresponding polygonal shaped clearance facing to the filling tube and matching with the polygonal cross-section of the brake section of the filling tube when in the brake position.

2. The combination according to claim 1,
   wherein the third brake body is mounted in the brake position.

3. The combination according to claim 1,
   wherein the brake section of the filling tube has a triangular cross-section, and wherein the three brake bodies are provided each of which encloses a V-shaped clearance.

4. The combination according to claim 1, wherein the brake section of the filling tube has a hexagonal cross section, and wherein the three brake bodies each encloses a corresponding square-shaped clearance.

5. The combination according to claim 1, wherein the polygonal cross-section of the brake section of the filling tube comprises rounded edges of a predefined radius, and wherein the edges of the clearances of the brake bodies have corresponding radii.

6. The combination according to claim 1, wherein the three brake bodies comprise braking and sealing elements facing towards the filling tube.

7. The combination according to claim 6,
wherein the braking and sealing elements are formed by resilient brake lips.

8. The combination according to claim 6,
wherein the braking and sealing elements are formed by string-shaped resilient elements.

9. The combination according to claim 6,
wherein the braking and sealing elements are of an at least partially approximately tubular inflatable construction.

10. The combination according to claim 6,
wherein at least one drive is provided for linearly driving the three brake bodies radially towards the brake section of the filling tube.

11. The combination according to claim 10,
wherein separate drives are provided for each of the three brake bodies.

12. The combination according to claim 11,
wherein a control unit is provided for controlling the drives of the three bodies.

13. The combination according to claim 12,
wherein the three brake bodies are movable at least approximately in the same plane.

14. The combination according to claim 13,
wherein the three brake bodies overlap partially each other.

15. A casing brake and filling tube combination according to claim 6 for use in an apparatus for filling and closing said tubular or bag-shaped packaging casing, like a clipping machine.

16. The combination according to claim 1,
wherein at least one drive is provided for linearly driving the three brake bodies radially towards the brake section of the filling tube.

17. The combination according to claim 16,
wherein separate drives are provided for each of the three brake bodies.

18. The combination according to claim 16,
wherein a control unit is provided for controlling the drives of the three bodies.

19. The combination according to claim 1,
wherein the three brake bodies are movable at least approximately in the same plane.

20. The combination according to claim 1,
wherein the three brake bodies overlap partially each other.

21. A casing brake and filling tube combination according to claim 1 for use in an apparatus for filling and closing said tubular or bag-shaped packaging casing, like a clipping machine.

* * * * *